Oct. 17, 1967

C. N. McKINNON 3,348,079

PULSE MAGNETOHYDRODYNAMIC GENERATOR

Filed March 23, 1965

INVENTOR
CHARLES N. McKINNON

Oct. 17, 1967   C. N. McKINNON   3,348,079
PULSE MAGNETOHYDRODYNAMIC GENERATOR
Filed March 23, 1965                            2 Sheets-Sheet 2
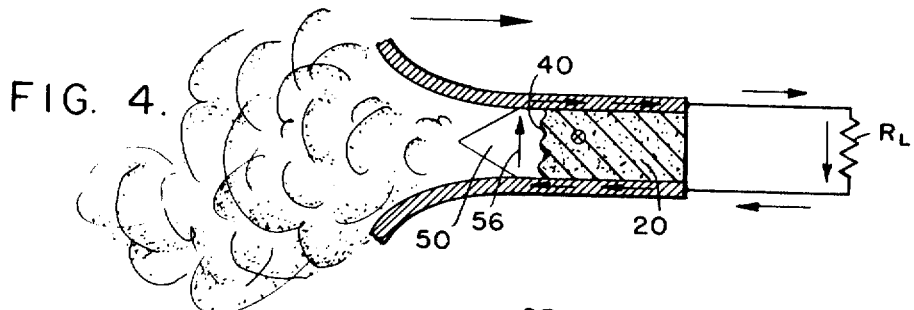
FIG. 4.
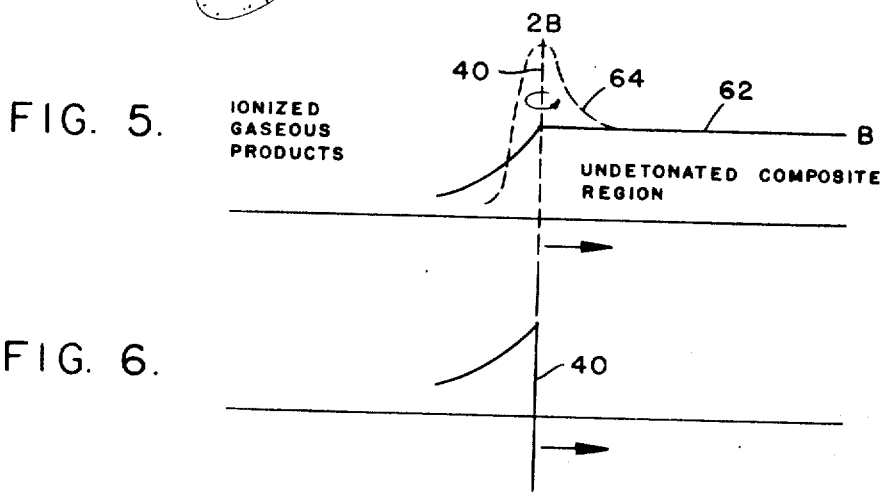
FIG. 5.
FIG. 6.
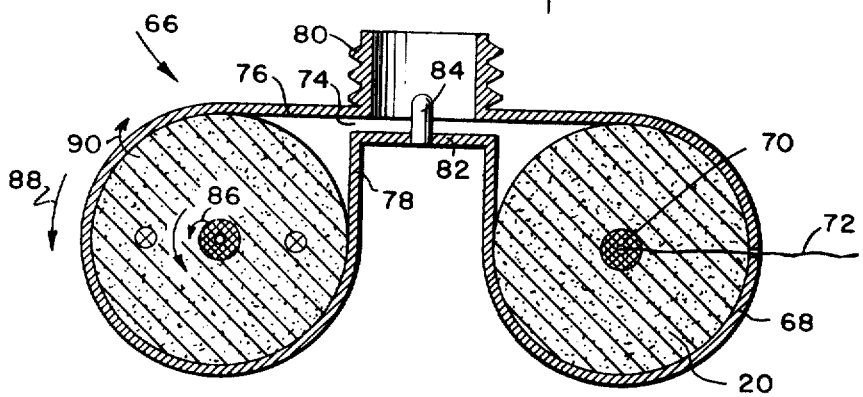
FIG. 8.
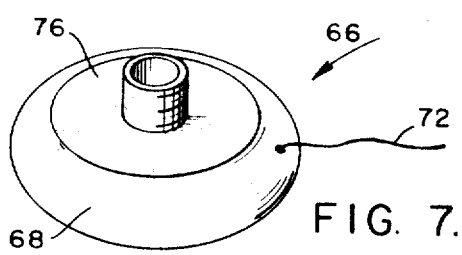
FIG. 7.
INVENTOR.
CHARLES N. MC KINNON
BY
ATTORNEY.

United States Patent Office 3,348,079
Patented Oct. 17, 1967

3,348,079
PULSE MAGNETOHYDRODYNAMIC
GENERATOR
Charles N. McKinnon, Columbia, Mo., assignor, by mesne assignments, to the United States of America as represented by the Secretary of the Navy
Filed Mar. 23, 1965, Ser. No. 442,219
11 Claims. (Cl. 310—11)

The present invention relates to a magnetohydrodynamic (MHD) generator and more particularly to an MHD generator which is capable of generating a short pulse without the necessity of a separate means to produce an exterior magnetic field.

The electric generator is based upon Michael Faraday's well known principle that a current is induced in a conductor when the conductor is moved across a magnetic field. The MHD generator is also based upon Faraday's principle, however, instead of utilizing a moving copper conductor the MHD generator employs a moving body of conductive gas. As this gas moves across a magnetic field a current is induced therein which can be utilized for power purposes.

The MHD generator has an important advantage over the ordinary electric generator in that, for a desired output current, the MHD generator is phenominally smaller. The small size of the MHD generator makes its use very desirable for many applications such as space and emergency communications. Further, the pulse MHD generator may be used for providing power to such equipment as high power radar sets, sonar systems and laser light pumps.

Previous pulse MHD generators have required an external means for producing a magnetic field. This external means may take the form of an electromagnet which is powered from some exterior power source. The electromagnet and the power source increase the size of the MHD generator and limits its application only to instances where an outside power source is available. The present invention obviates the need of the electromagnet and the exterior power source by utilizing a composite of magnetic and explosive materials which is disposed in a particular manner with respect to a pair of electrodes. When the composite is progressively detonated, a current is induced in a traveling detonation head or gas front region which moves into the adjacent undetonated composite region. The traveling gas front region forms a conducting path and the motion of this conductive path through the magnetic field of the adjacent undetonated composite produces an electric field which appears as a voltage at the electrodes. This electrical potential can then drive a current through an external load connected to the electrodes.

An object of the present invention is to provide a pulse MHD generator which is more compact than prior art pulse MHD generators.

Another object is to provide a pulse MHD generator which does not require an exterior means to develop a magnetic field.

Other objects, advantages and novel features of the invention will become apparent from the following detailed description of the invention when considered in conjunction with the accompanying drawings wherein:

FIG. 4 is a longitudinal cross sectional view of the above generator with the encapsulation removed and while in operation;

FIG. 5 is curve illustrations of the magnetic field intensity in the vicinity of the gas front within the above generator;

FIG. 6 is a curve illustration of the conductivity of the ionized gaseous products to the rear of the gas front;

FIG. 7 is an isometric view of another type of pulse MHD generator; and

FIG. 8 is a cross-sectional view through the MHD generator shown in FIG. 7.

Figure 1:
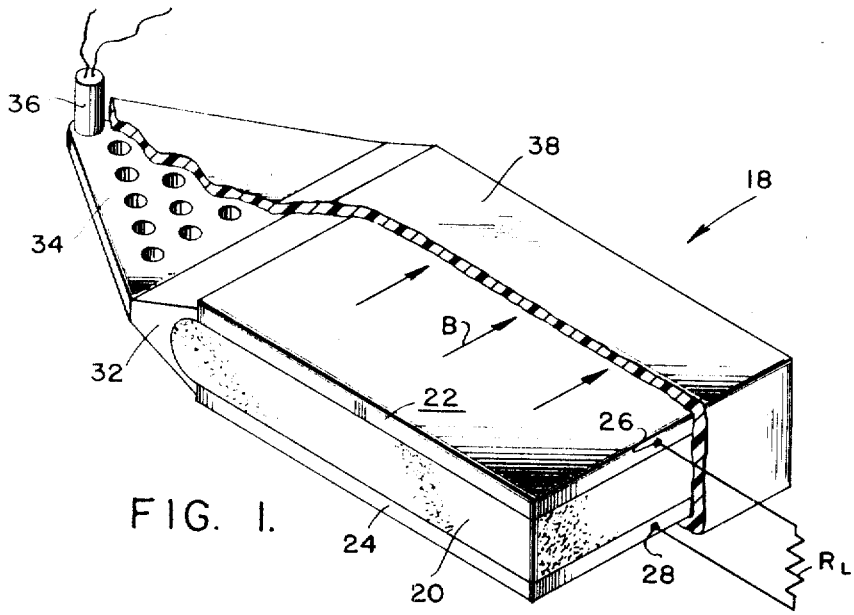
FIGURE 1 is an isometric view with a portion of the encapsulation cut away of a pulse MHD generator which is one embodiment of the present invention.
Figure 2:
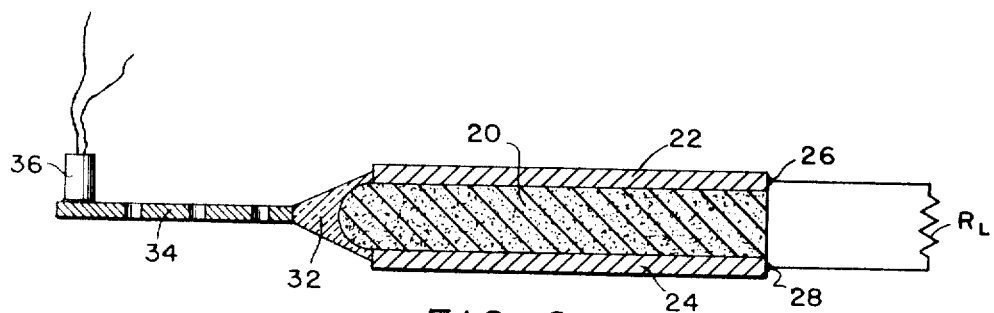
FIG. 2 is a cross sectional side view of the same generator with the encapsulation removed.

Referring now to the drawings wherein like reference numerals designate like or similar parts throughout the several views there is shown in FIGS. 1 and 2 a MHD generator 18 which is one embodiment of the present invention. The generator 18 includes a slab of composite 20 of magnetic and explosive materials disposed between and in intimate contact with a pair of plate conductors 22 and 24 such as copper or aluminum. Each of the plate conductors 22 and 24 has a terminal 26 and 28 respectively at its rear edge to which a pair of leads are connected for feeding power to a load, the load being represented as a resistance $R_L$. The magnetic material is polarized, which polarization may be in the direction of the arrows B shown in FIG. 1.

The composite is detonated by an explosive train consisting of an explosive lens 32 which is generally triangular in cross section and has a concave base which extends in contact along a front edge of the explosive composite 20. The lens 32 is detonated by a triangular line wave generator 34 which extends in contact along the longitudinal apex of the lens 32 and may be constructed of a perforated sheet of explosive material such as Detasheet. The line wave generator is in turn initiated by a standard detonator 36, such as a No. 8 blasting cap which is connected at a forward end of the line wave generator 34. The whole assembly except the load $R_L$ can be encapsuled in an insulating compound such as ordinary potting compound 38 to protect the device from its environment and further to hold the components in their indicated positions prior to initiation.

The direction of the magnetic field B of the composite 20 as indicated in FIG. 1, is parallel to the plane of the plate conductors 22 and 24 and the plane of the detonation front or gas front region 40 which is shown in FIG. 4. Upon detonation of the blasting cap 36 a detonation wave travels through the triangular line wave generator 34 in such a manner that the detonation front is formed straight thereacross. In this way, all points along the longitudinal apex of the explosive lens 32 are initiated simultaneously. The lens upon initiation will spread the detonation from a line to a plane detonation wave which then detonates the composite 20 uniformly along its front edge.

The theory underlying the operation of the embodiment shown in FIGS. 1 and 2 will be understood by referring to FIG. 3 and FIGS. 4 through 6. As shown in FIG. 4 the composite 20 has a transverse magnetic field B which extends into the drawing. The direction of the magnetic field is not important and it could extend in an opposite direction if desired. The composite 20 has been detonated and is shown in a stage prior to complete consumption. In this stage hot ionized gaseous products 50 have been formed immediately behind an undetonated magnetic composite portion 20 and immediately behind the undetonated composite is the gas front region 40. The progressive movement of the ionized gas front region 40 through the transverse magnetic field B of the undetonated composite 20 causes a current to be induced in the gas front region 40, this current moving in the direction of the arrow 56. Since the gas front region 40 is in electrical communication with the plates 22 and 24, these plates act as electrodes to pick up the current and deliver it to the load $R_L$. In addition to the gas front region 40 there may be a highly compressed undetonated region immediately in front of the gas front 40 which also acts to conduct an induced current to the plates 22 and 24.

Figure 3:
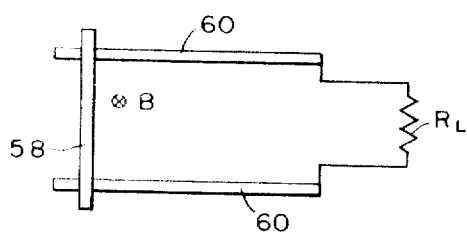
FIG. 3 is a schematic view to illustrate the principle of operation of the embodiment shown in FIGS. 1 and 2.

The operation of the generator may be easily visualized by considering the gas front region 40 as a shorting bar 58, as shown in FIG. 3, which is shorted across a pair of electrodes 60. If the shorting bar 58 is moved to the right through a transverse magnetic field B a voltage is induced in the shorting bar which will appear at the electrodes 60. Otherwise, the gas front region 40 is analogous to the shorting bar 58 and the operation of the generator is simply an application of Faraday's law.

FIG. 5 illustrates the strength of the magnetic field in the gas from region 40. The curve 62 represents the magnetic field intensity B due to the undetonated composite and the curve 64 represents the combined magnetic field intensity due to the undetonated composite and the magnetic field intensity about the gas front region 40.

Since the gas front region 40 acts similar to a shorting bar, as shown in FIG. 3, the induced current upwardly through the gas front region 40 causes a magnetic field as shown by the arrow in FIG. 5. The strength of this magnetic field may be equal to the strength of the magnetic field of the undetonated composite. Accordingly, this induced magnetic field adds to the magnetic field of the undetonated composite resulting in a field strength which reaches a peak of 2B or twice the field strength of the undetonated composite in the gaseous front region 40. The increase in the magnetic field strength in the area of the gas front region 40 due to the induced current through the gas front and electrodes is a boot strap type of operation and it enables surprisingly high currents to be developed with a relatively small device. As shown in FIG. 5, the magnetic field strength of the undetonated region (curve 62) and the combined field strength of the undetonated region plus the induced magnetic field (curve 64) both decrease rapidly in the ionized gaseous region to the left of the gas front region 40. To the right of the gas front region 40 and in the undetonated composite region the magnetic field B of the composite remains unaffected and the combined magnetic field decreases fairly rapidly until it reaches an intensity B. The curve in FIG. 6 is shown merely to illustrate the decrease in conductivity of the gaseous products immediately behind the gaseous front region 40.

In FIGS. 7 and 8 there is shown a pulse MHD generator 66 which is another embodiment of the present invention. The generator 66 includes a combustion chamber 68 which is generally toroidal in shape and is constructed of a conductive material such as copper. Disposed within the combustion chamber 68 is the composite 20. The composite 20, in this embodiment, is generally toroidal in shape and is preferably in close contact with the inner wall of the combustion chamber 68. Disposed along the annular central axis of the composite 20 is an explosive booster 70 and along the central axis of the booster 70 is located an ignitor wire 72. The ignitor wire 72 extends through the booster, the composite 20 and the combustion chamber 68 to the exterior of the generator 66 so that a current may be applied to the wire 72 for ignition purposes.

As shown in FIG. 8 the combustion chamber 68 is a true toroid only throughout 270° of its cross section. The combustion chamber is annularly broken at 74 by tangentially extending the walls 76 and 78 of the combustion chamber toward one another and leaving an annular space therebetween. The combustion chamber wall 76 may extend upwardly to form an upstanding annular flange 80. The flange 80 may be provided with external threads so that a coaxial cable (not shown) may be threaded thereon. The vertically extending combustion chamber wall 78 may be interconnected by a transverse circular portion 82 which is also constructed of a conductive material. Extending upwardly from the transverse circular portion 82 is an upstanding electrical prong 84 which is adapted to be inserted within a female portion of the coaxial cable. Accordingly, the annular break 74 in the combustion chamber 68 forms a pair of spaced apart electrode ends which may be shaped to any desired configuration for connection to power lines, such as the coaxial cable.

Upon detonation of the composite 20 the exploding composite will induce a voltage into the toroidal combustion chamber 68 and this voltage appears at the annular flange 80 and the upstanding prong 84 for power purposes. After detonation the composite explodes radially which causes a radially moving gas front to interact with the magnetic field of the undetonated composite and produce azimuthal currents which are picked by the conductive combustion chamber 68. In the same manner as described hereinabove the conductive gas front causes an induced magnetic field in the direction of the arrow 86 shown in FIG. 8 to double the magnetic field in the gas front region so that the magnetic field is twice that of the undetonated composite. If the combustion chamber 68 is connected to an external load so as to provide a completed current path, the combustion chamber will, in its attempt to maintain the total flux within the combustion chamber constant, develop a current in the direction of the arrow 88, as shown in FIG. 8. The arrow 90 about the combustion chamber 68 shows the magnetic field which is attempting to maintain the total flux in the system constant. The current represented by the arrow 88 appears at the annular flange 80 and the upstanding prong 84 for power purposes as stated above.

It should be noted that there is a slight difference in operation between the embodiment shown in FIGS. 1 and 2 and the embodiment shown in FIGS. 7 and 8. In the first embodiment the current is delivered directly to the plates 22 and 24 by the conductive gas front 40 whereas in the latter embodiment a current is induced in the combustion chamber 68 due to the attempt of the combustion chamber to hold the magnetic flux therein at a constant value.

As stated hereinabove, the composite 20 is a combination of magnetic and explosive materials. Preferably the explosive material content of the composite is between 15% and 25%. Ceramic magnets such as Indox have a sintered construction and are quite porous. The pores of such magnets can be made to comprise 15% to 25% of the volume and these pores may be filled with an explosive material such as RDX, PETN, or TNT. By maintaining the explosive material content within the range of 15% to 25% the composite will have stable detonation properties. If desired, a powdered iron or manganese-bismuth (Bismanol) powder may be used as the magnetic material in the composite. The composite may be fabricated by a pressing operation of either of these materials with a high explosive under pressures which are compatible with such explosive.

It is now readily apparent that the present invention provides a pulse MHD generator which is more compact than prior art pulse MHD generators since it does not require an exterior means to develop the required magnetic field. The present invention relies upon the magnetic field of an explosive composite and the presence of this field at a moving conductive gas front results in an induced current.

I claim:
1. A pulse magnetohydrodynamic generator comprising:
    conductor means;
    a composite of magnetic and explosive materials disposed adjacent to and in contact with said conductive means, said magnetic material being polarized;
    means for retaining the disposed relationship of the conductor means and said composite, whereby upon progressive detonation of said composite a traveling gas front region adjacent an undetonated composite region induces a current in said conductor means.

2. A pulse magnetohydrodynamic generator as claimed in claim 1 wherein:
the conductor means is a pair of spaced apart conductive plates and the composite is disposed between said plates.

3. A pulse magnetohydrodynamic generator as claimed in claim 1 wherein:
said magnetic material is porous with the pores comprising approximately 15–25% of the volume of the magnetic material; and
said pores are filled with said explosive material.

4. A pulse magnetohydrodynamic generator as claimed in claim 3 wherein:
the magnetic material is Indox.

5. A pulse magnetohydrodynamic generator as claimed in claim 1 wherein:
said conductor means is a toroidal conductive chamber and said composite is disposed therein.

6. A pulse magnetohydrodynamic generator as claimed in claim 5 including:
means located along the annular central axis of said composite for igniting said composite.

7. A pulse magnetohydrodynamic generator as claimed in claim 5 wherein:
the toroidal chamber is annularly broken so as to form a pair of spaced apart electrode ends.

8. A pulse magnetohydrodynamic generator comprising:
a generally toroidal combustion chamber constructed of a conductive material;
a generally toroidal composite of magnet and explosive materials disposed within said chamber, said magnetic material being polarized;
means located along the annular central axis of said composite and extending through said combustion chamber for igniting said composite;
the toroidal chamber being annularly broken so as to form a pair of spaced apart electrode ends,
whereby upon igniting said composite the exploding composite induces a current into the toroidal chamber for use at said electrode ends.

9. A pulse magnetohydrodynamic generator as claimed in claim 8 wherein:
said magnetic material is porous with the pores comprising approximately 15–25% of the volume of the magnetic material; and
said pores are filled with said explosive material.

10. A pulse magnetohydrodynamic generator as claimed in claim 9 wherein:
the magnetic material is Indox.

11. A pulse magnetohydrodynamic generator as claimed in claim 10 wherein:
the explosive material is RDX.

References Cited
UNITED STATES PATENTS

| | | | |
|---|---|---|---|
| 2,889,776 | 6/1959 | Gunther | 102—70.2 |
| 3,225,227 | 12/1965 | Biehl | 322—2 |

MILTON O. HIRSHFIELD, *Primary Examiner.*

DAVID X. SLINEY, *Examiner.*